Patented Nov. 21, 1944

2,363,067

UNITED STATES PATENT OFFICE 2,363,067

CERAMIC MATERIALS

James R. Lait, Wembley, England, assignor to General Electric Company, a corporation of New York No Drawing. Application November 29, 1939, Serial No. 306,695. In Great Britain December 9, 1938

4 Claims. (Cl. 106—52)

My invention relates to ceramic materials in general, and more particularly to ceramic materials adapted to be sealed to the glass envelopes of electric incandescent lamps and discharge devices to thereby form a part of, and hermetically seal such envelopes.

Steatite, because of its exceptional dielectric properties, is widely used as an insulator in electric incandescent lamps and discharge devices. The properties that make steatite valuable for such insulator purposes also make it valuable as a ceramic seal through which pass the leading-in wires, and possibly also the exhaust tube, of such lamps and discharge devices. However, the expansion coefficient of steatite ($8.2 \times 10^{-6}$ per °C.) is so different from that of most glasses that are usually employed for the envelopes of such devices that it is difficult to seal the steatite to such glasses.

One object of my invention is to provide ceramic materials composed mainly of steatite which will readily seal to the various types of glasses usually employed for the envelopes of electric incandescent lamps and discharge devices.

Further objects and advantages of my invention will appear from the following description of species thereof.

I have found that the effective expansion coefficient of steatite (i. e. the expansion coefficients of the glasses to which steatite is easily sealed), may be changed considerably by mixing it with suitable refractory insulating materials of other expansion coefficients without material loss of its valuable electrical properties. If the effective expansion coefficient is to be raised, the admixed material is preferably magnesia, whose expansion coefficient is $13.0 \times 10^{-6}$. Indeed, I know of no other suitable material. If the effective expansion coefficient is to be lowered, the choice of admixed materials is much wider. Zirconium silicate is among those that have proved suitable for this latter purpose, its expansion coefficient being $4.5 \times 10^{-6}$ per °C. The expansion coefficients mentioned above are measured between 20° C. and 800° C.

According to the invention, therefore, a ceramic material forming part of a hermetically sealed envelope consists of a mixture of steatite with a material of an expansion coefficient substantially different from that of steatite, the proportion of the steatite being at least 50 per cent, whereby the effective expansion coefficient of the material is substantially different from that of steatite alone. The mixture may be prepared by mixing intimately the steatite and the other material, both finely powdered, and firing the mixture at about 1350° C. A binder may be used but is not usually necessary.

One particularly useful material consists of 90 per cent steatite and 10 per cent magnesia. It will seal readily to a soft glass having a relatively high expansion coefficient of 9.0 to $9.2 \times 10^{-6}$ per °C. measured from room temperature to its lower annealing point, in this case 20°–350° C.

By the addition of 50 per cent zircon silicate to steatite, a material can be obtained that will seal easily to a hard glass having a relatively low expansion coefficient lying between 4.0 and $5.0 \times 10^{-6}$ per °C. measured again from room temperature to the annealing point. I have also found that the zirconium silicate in the above mixture can be replaced partly, or even wholly, by zirconia without any great change in the effective expansion coefficient of the said mixture. Since zirconia has an expansion coefficient of $8.0 \times 10^{-6}$, this fact is most easily explained by supposing that the zirconia reacts with the steatite to form zirconium silicate. But no experiments have yet been made to confirm this suggestion.

Neither steatite nor a mixture according to the invention is easily prepared so as to be non-porous. Accordingly it is preferable, or even necessary, to adopt the known expedient of glazing the surface of the material. Preferably, the ceramic material is first coated with powdered glass from a suspension and then heated until the glass melts. The glass employed for the glaze is preferably of the same composition as the glass to which the ceramic is to be sealed.

What I claim as new and desire to secure by Letters Patent of the United States is:

1. A ceramic material which is adapted to be sealed to glass and consists of the heat-reaction product of a mixture of steatite and a material selected from the group consisting of magnesia, zirconia and zirconium silicate, the proportion of steatite in the mixture being at least 50 per cent.

2. A ceramic material which is adapted to be sealed to glass and consists of the heat-reaction product of a mixture of about 90 per cent steatite and 10 per cent magnesia.

3. A ceramic material which is adapted to be sealed to glass and consists of the heat-reaction product of a mixture of about 50 per cent steatite and 50 per cent zirconia.

4. A ceramic material which is adapted to be sealed to glass and consists of the heat-reaction product of a mixture of about 50 per cent steatite and 50 per cent zirconium silicate.

JAMES R. LAIT.